UNITED STATES PATENT OFFICE 2,064,567

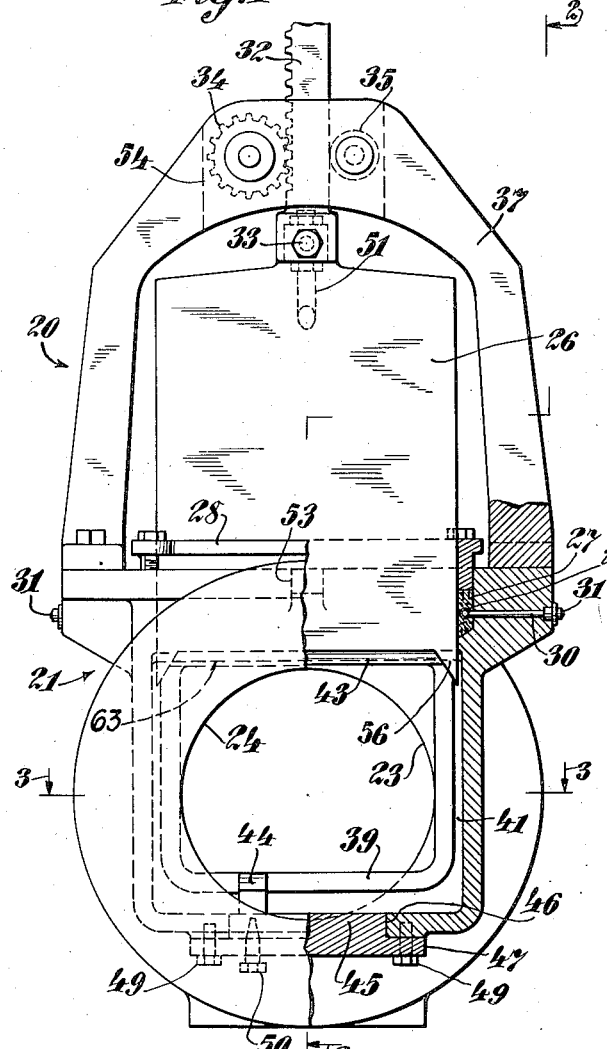

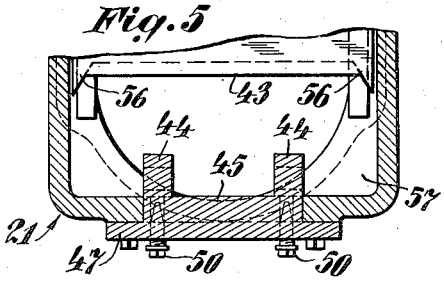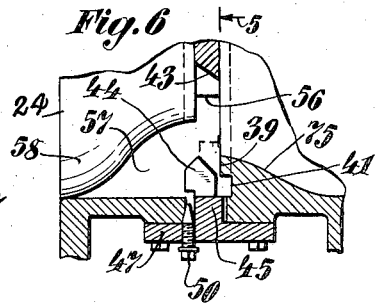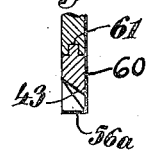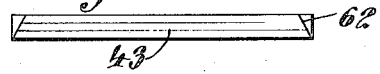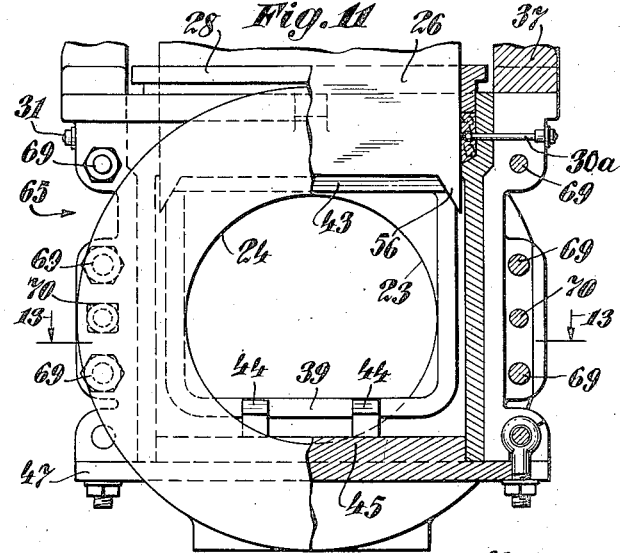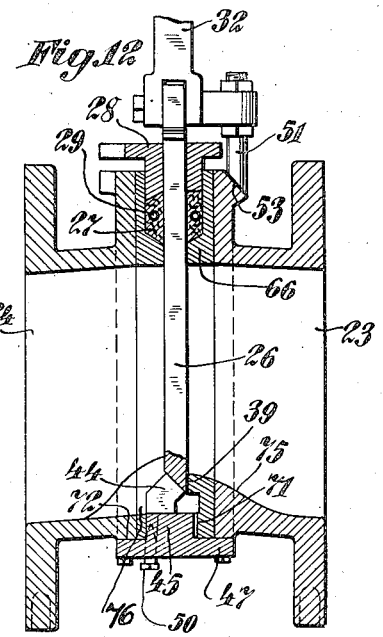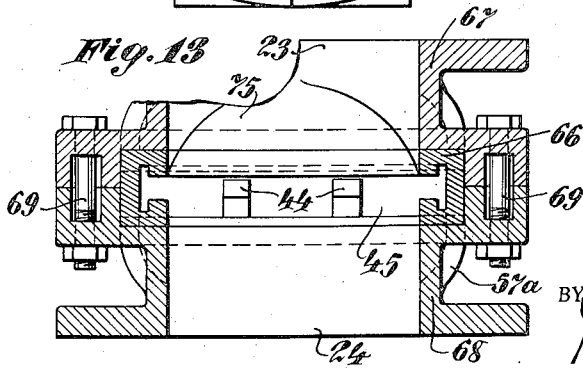

VALVE

Fred E. Riley, Livermore Falls, Maine

Application February 14, 1936, Serial No. 63,824

15 Claims. (Cl. 251—56)

This invention relates to gate valves, with particular reference to non-clogging structures.

In gate valves which control the flow of solid bearing fluids, or of plastic or viscous liquids or mixtures, especially pulp stock, solid constituents have collected in the valve casing, and particularly in the grooves of the gate seat. In the former instance, such constituents had to be removed by draining or otherwise cleaning the valve casing, but the materials which collected in the grooved seat have presented greater difficulties, and in their compacted form as where the valve has remained closed for any length of time, have often seriously interfered with the operation of the valve. Sometimes it has been impossible to move the gate, and the full closing thereof has also been rendered difficult even where the gate could be moved.

It is therefore an object of this invention to provide a gate valve which shall be self cleaning in the casing and in the valve seat, to the degree that operation of the valve shall be relatively easy at all times, and the valve casing relatively free of flow impeding masses.

Another object of the invention is to provide a gate valve having improved means for cleaning the grooved seat coincident with the closing movement of the gate by expelling the clogging materials toward the center of the valve, where they are readily washed away when the valve is again opened.

This is of especial advantage if the clogging materials are expelled on the outlet side of the gate, since such materials may become dry and hard in the absence of liquid. However, the gate valve may also have cut outs in the side walls of the casing at the outlet side of the gate to facilitate the removal of the clogging materials.

Another object of the invention is to provide improved cleaning means for the gate grooves, such that the cleaning means precedes the gate to cause washing out of materials before the gate is closed; and the cleaning means may advantageously assume the form of scoop points or wedges.

It is to be borne in mind that the seat forming grooves are located preferably only at the sides of the gate. To facilitate cleaning or scraping of the other parts of the gate seat, including certain groove faces, the gate may have its lower edge beveled; further the casing may have certain of its upper edges adjacent to the gate seat accentuated to efficiently scrape the gate as the latter moves upward to open position.

In order to prevent undue or scraping contact of the knife-like beveled edge of the gate with the seat thereof, the pressure or inlet side of the valve is at a side of the gate, such that the gate is pressed away from that face of the seat which might mar the knife edge. It is therefore an object of the invention to broadly provide such coordination in a valve having a beveled leading edge for the gate, that the gate is movable or pressure thereon controllable in the axial direction of the valve to maintain the condition of the leading edge.

A related object of the invention is to provide improved means coordinated with the gate to move the same powerfully axially toward a face of its seat when the valve is closed. This feature is of advantage even if the gate has the ordinary non-beveled leading edge in a non-expanding gate.

Another object of the invention is to provide improved means for so axially moving the gate to tightly close the valve by exerting pressure on the gate at a series of distributed points to prevent deformation or springing of the gate; said means may include elements outside the valve for easy accessibility; and said means may include novel packing means for the gate; the several features being of advantage in individual and conjoint use.

Another object of the invention is to provide a gate having at its leading edge a knife edge portion of specially hard metal; and such portion may comprise the scoop elements in an improved one piece structure.

Another object of the invention is to provide a gate valve having a one piece casing and improved adjustable means for pressing the gate against a face of its seat to take up wear, and to thus dispense with the need for special seats or two piece casings that are adjustably bolted together, or expandible gates.

A particular object of the invention is to provide a gate valve having its inlet side remote from the downwardly recessed outlet portion that receives the scooped out materials, to thus cause the cleaning of the recessed portion in the open position of the valve.

A further object of the invention is to provide a valve having relatively few and simple parts and which is inexpensive to manufacture and assemble, durable, reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a view with parts in front elevation and parts in section showing a device embodying the invention.

Fig. 2 is a view with parts in side elevation and parts in section of the same.

Fig. 3 is a horizontal sectional view taken on the line 3—3 of Fig. 1.

Fig. 4 is an enlarged fragmentary sectional view of an edge portion of the gate and coacting casing portion.

Fig. 5 is a fragmentary vertical sectional view taken on the line 5—5 of Fig. 6, but including a modified gate seat arrangement.

Fig. 6 is a fragmentary transverse sectional view thereof.

Fig. 7 is a fragmentary detailed view in front elevation of the gate.

Fig. 8 is a bottom edge view thereof.

Fig. 9 is a sectional view taken on the line 9—9 of Fig. 7.

Fig. 10 is a transverse sectional view of a packing gland.

Fig. 11 is a fragmentary view in front elevation with parts in section showing the invention as embodying a renewable seat.

Fig. 12 is a transverse vertical sectional view thereof.

Fig. 13 is a horizontal sectional view thereof.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 20 denotes a device embodying the invention. The same includes a gate valve comprising preferably a one piece casing having a flow passage 22 comprising an inlet end 23 and an outlet end 24. Intersecting the passage 22 is a passage 25 for a gate 26. The latter may be sealed by any suitable packing box or means which may include packing 27 and a pressure gland 28. If desired, a lubricant feed tube or conveying means 29 may be provided in and extending along the packing, and being in communication with a passage 30 in the casing controlled by a pressure supply fitting or valve 31. The gate may extend through the gland for actuation by any suitable power means which may include a rack 32 suitably rigidly connected or bolted thereto as at 33. The rack 32 may be engageable by a gear 34 that is in opposed relation to the idler 35, and rotatable as by a handwheel 36. A bonnet 37 rigidly suitably connected to the casing 21 may serve as a mounting for the elements 34, 35 and as a guide for the rack. As thus far described, the gate valve may be conventional.

The casing 21 may provide a grooved seat 38 in the side walls, lying in the plane of the passage 25. The grooved seat comprises an inlet side face 39 and an outlet side face 40, and provides an enlarged groove area 41 extending axially and laterally beyond the faces 39, 40 to facilitate machining of said faces and to provide a clearance with certain pulp stock that may lodge in the grooves 38, for a purpose hereinafter described.

The outlet side face 40 is desirably cut away at the bottom of the casing as shown in Figs. 2 and 3, and the bottom wall 42 of the casing at the outlet side thereof slopes downwardly toward the outlet 24. The inlet side face 39 is continuous along the sides and bottom of the casing as shown in Figs. 1 and 2, and is also continuously undercut or grooved as at 41 at the bottom of the casing. The groove portions 41 terminate at the passage 25 and somewhat below the packing 27, so that the latter cannot be pressed downward into said groove portions.

One important feature of the invention is that the inlet side 23 of the valve is so arranged relative to the seat 39, that the flow pressure tends to move the gate 26 away from the seat 39. It is noted that the latter is relied upon for the actual tight closure engagement with the gate, and hence undue wear against the sealing seat 39 is avoided. This arrangement is of especial advantage if means is provided effective in the closed position of the gate for causing the gate to be pressed against the sealing seat 39; and, further, if the gate be provided with a beveled leading edge 43. These features may be combined as by the use of a toe portion 44 at the bottom of the gate, engageable with the bevel as with a camming action, whereby the gate is automatically pressed against the sealing seat 39. When the gate is moved in raised position, marring of the sealing seat 39 by the knife edge 43 of the gate is thus avoided.

Preferably a plurality of the toe portions 44 are utilized in an adjustable manner as by being formed integrally with a support 45 which is adapted to be received with clearance in an opening 46 of the valve casing, lying in the plane of the gate. For external operation and adjustment, the support 45 may comprise an external closure plate 47 for the opening 46 which coacts with a closure seat 48 on the casing and is bolted to the latter as at 49. The bolts 49 pass through enlarged holes in the plate or flange 47, so as to be adapted to be shifted. Taper pins 50 threaded in the plate 47 engage in holes in the casing, or, for instance, engage a side wall of the opening 46 whereby the toe portions 44 can be powerfully moved toward the right and secured in set position as by tightening the bolts 49.

A feature of the invention, in a broader sense, is the provision of means for automatically acting at a plurality of widely spaced points on the gate for pressing the same against the sealing seat 39 in the closed position, while otherwise permitting free movement of the gate in part and full open position. The action of one part embodiment as at 44 has already been described. Another part of the embodiment may include a means, preferably adjustable and externally accessible, such as a bolt or follower 51 vertically adjustably threadedly connected at 52 to the gate or actuator 32. The follower 51 may have engagement with a cam 53 on the valve casing, when the gate approaches closed position. By adjusting the members 44, 51 or either of them, a relatively uniform pressure on the gate against the sealing seat 39 may be obtained.

To facilitate the movement of the gate in its closed position toward the sealing seat 39, the gate actuating means allows for such movement. In this case, the rack 32 may have some clearance with its co-operating parts including the yoke 37, as in the opening 54 thereof.

In order to facilitate snug sealing of the gate at the packing and to prevent the latter from militating against the movement of the gate toward the sealing seat 39, the gland 28 may have a projection 55 extending along the side thereof remote from the plane of the sealing seat 39, and desirably tapering off at its ends as shown in Fig. 10. The arrangement is such as to tend to produce a relatively average pressure condition in the packing, and to prevent undue differences in pressure in the packing, at the opposite sides of the gate, as between open and closed positions of the gate. However, the arrangement may also be regarded as producing a packing pressure so distributed as to tend to press the gate toward the sealing seat 39.

It will now be perceived that the seats 40 act primarily as a guide for the gate and cooperate with the seat 39 and the opening 25 to afford a clearance for the gate to permit the same to move freely, without binding by pulp stock, and without scraping of the sealing seat 39 by the knife edge 43 of the gate. In course of downward movement of the gate, the same tends to scrape the grooves 38 along the seats 39, 40, causing pulp stock so scraped to be expelled, in part, from the grooves onto the bottom casing wall 42. The fluid passing through the valve from the inlet end 23 tends to wash away this material as the gate moves toward closed position.

However, as soon as the leading edge of the gate contacts the bottom portion of its sealing seat 39, no further flow is available to wash away solids. Hence the gate is provided with confronting end scoop portions 56 projecting below the leading edge of the gate and being confined substantially to the valve grooves. These scoop portions may be generally triangular as shown, and have the effect of moving scraped pulp stock masses toward the central region of the valve casing, where they are readily washed away. Since the scoop portions project below the gate leading edge, the scooping action occurs primarily before the gate moves to fully closed position, so that the fluid may enter and wash away solids before the valve is fully closed. These scoop portions 56 are adapted to shear through solids collected in the gate seat grooves and tend to tear out solids collected in the groove enlargements 41, and thus act so that the solids will not cause the gate to stick. Nevertheless, the scoop portions preferably lie within the boundaries of the side edges of the gate so that the latter can be inserted and assembled in the valve through the relatively snug fitting opening 25. The scoop portions 56 need not engage the bottom of the valve casing, but the latter affords sufficient clearance therefor as shown.

It will now be seen that the gate knife edge 43 and scoop portions 56 move with the gate, the former to clean the sealing seat 39 and the latter to clear out the seat grooves 38 to prevent solids from causing the gate to stick.

If desired, and as shown in Figs. 5 and 6, the casing side walls may be provided with cut outs or openings 57 at the outlet side of the valve and communicating with the lower ends of the valve grooves 38 whereby solids from the latter may be readily received in said openings 57 and thus washed away with the aid of a flow of liquid from the inlet end 23. It is noted that the openings 57 may represent cut outs in the seat 40 of the gate grooves, and receive solids prior to full closing of the gate. After the gate is fully closed, there will be little or no residue in the cut outs 57, and the scoops will assure that the path of the gate is relatively clear. If necessary, the casing may be widened at the cut outs 57 and then tapered inward as at 58 toward the outlet end.

Further, the lower ends of the scoops are in spaced relation to the bottom of the casing in the closed position of the gate to afford a clearance for drainage from the gate seat grooves 38. If a two piece casing is employed, the seating grooves may snugly fit the edges of the gate to assure full positive cleaning thereof. If desired, the outlet passage 22 may be fully horizontal.

Ease in the travel of the gate may be further facilitated by the rounding of the side edge corners thereof as shown at 59, whereas the scoop portions 56 may be finished square along said edges.

Preferably the leading edge of the gate may be formed of extra hard metal and may consist of a strip such as 60 shown in Figs. 7, 8 and 9 having at 61 a miter joint with the gate, or otherwise rigidly connected thereto. The strip 60 may comprise the knife edge 43 and the scoop portions 56a as a one piece structure. The portions 56a may also be beveled toward the outlet end as shown at 62. To scrape clean the opposite surfaces of the gate, the upper casing wall may have longitudinal recesses affording edges accentuated or beveled edges 63.

It will be understood that the improvement disclosed in Figs. 5 to 9 may be regarded as fully incorporated in Figs. 1 and 2, from which they have been omitted for greater clarity in the drawings. The vertical extent of the cutouts may be at least approximately twice the width of the seating face 39, and the length of the scoops below the leading edge of the gate may be approximately twice the width of said face, with the scoops desirably defining a relatively large apical angle of from 30 to 45 degrees.

In Figs. 11 to 13 is shown a modification 65 embodying the invention with particular reference to a renewable gate seat 66 housed in the split portions 67, 68 of the casing. These sections are bolted together as at 69. At 70 are provided set screws threaded into one section of the casing and adapted to bear on the other section to spread the casing open upon loosening the bolts 69 to thus facilitate removal of the renewable seat 66 without removing the casing from the pipe line. The gate 26 is movable in the renewable seat in the same manner and coordination as before, and the elements 44 being adjustably fitted in a lower opening 71 of the renewable seat, but the plate 47 affording a closure for the bottom opening 72 of the casing as well as for that of the renewable seat. The elements 51, 53 interengage over the renewable seat which is rigidly clamped in fluid tight relation in the casing. The gate is packed with the renewable seat, the lubricant passage 30a extending through the adjacent wall of the latter. The renewable seat is relatively plane throughout, and in any event free of obstructions which would prevent its easy removal from the casing. Since the renewable seat extends to the top of the casing, it may be readily engaged to facilitate its removal and repair or replacement. All features hereinbefore described may be incorporated in the device 65, except that a simple one piece casing with adjustability of the gate against its seat cannot be used, without rendering removal of the seat 66 unduly difficult. The cutouts 57 may also be incorporated in the device 65, these cutouts being formed in the renewable seat and in the casing, the latter being suitably widened beyond the gate seat as indicated at 57a to afford ample length and easy cleaning of the cutouts.

In the different forms of the invention it is noted that the casing passage at the gate seat is relatively square or oblong, and hence of increased capacity, even allowing for the rise at 75 at the inlet end, whereby the corresponding recess 76 is produced at the outlet end, due to cutting away of the adjacent seat 40. The rise at 75 may act as a flow constricting or weir means, which with its relatively sharp edge produces a turbulent flow. Such flow is accentuated as the gate approaches closing position, and in any event serves to thoroughly clean the recess 76, and the lower portions of the gate grooves, and also the cut outs 57. Thus the use of drains and clean outs of various types is avoided. In this connection the slope at 42 may be noted. Hence there is a distinct advantage in disposing the recesses 76 in opposite relation to the inlet end of the valve. This advantage combines with the others, in that the knife edge 43 is pressed away from the sealing seat 39 due to flow pressure, while closing the valve.

Therefore the valve may be regarded as self cleaning in a truer sense than heretofore possible, since the gate grooves are cleaned, the gate sealing seat freed of sticky masses, and the main body of the casing emptied of solid material, by the action of the gate combined with the turbulent or agitating flow of the flow directing means such as 75, and the cleaning of the grooves being facilitated by the center deflecting scoops that act in advance of the gate.

A one piece casing may be used which is cheaper to construct, and the means for pressing the gate toward the sealing seat may be regarded as take up means for play or wear so that a simple nonexpandible one piece gate may be employed. Said means may act at a plurality of pressure distributing points; are wholly automatic in action; are externally accessible; and are individually and collectively adjustable. The packing means may cooperate to maintain the gate fluid tight in its different positions of operation against and away from the sealing seat.

It will be appreciated that various changes and modifications may be made in the device as shown in the drawings, and that the same is submitted in an illustrative and not in a limiting sense, the scope of the invention being defined in the following claims.

I claim:

1. A gate valve having a casing, a gate therefor, said casing having a grooved seat for the gate affording clearance with the opposite faces of the gate to permit the gate to be freely moved between open and closed positions, means effective in the closed position of the gate for automatically moving the same toward one face of the grooved seat to assure tight closing of the valve, and means operable externally of the casing for adjusting said means to control the extent of movement of the gate toward said face of the seat.

2. A gate valve having a casing having a passage provided with an inlet end and an outlet end, a gate for the casing movable transversely of the passage, said casing having a grooved seat for the gate affording a predetermined clearance with the opposite faces of the gate, said grooved seat being cut away at the outlet side thereof at the bottom of the casing to prevent clogging, means acting on the gate to press the same toward the opposite side of the grooved seat in the closed position of the gate, and means adapted to be manipulated from the outside of the casing for adjusting the first mentioned means to control the pressure exerted thereby on the gate.

3. A gate valve including a casing having inlet and outlet ends, a gate, said casing having a continuous plane seat for the gate, said gate having a beveled edge at the lower end thereof for scraping excess solids from said plane seat, guide means for the gate to permit movement of the latter between open and closed position with a clearance with the plane seat to prevent abrasion of said beveled edge by said seat, including means for automatically causing movement of said gate against the plane seat in the closed position of the gate to thus cause tight closing of the valve, and means for adjusting the automatic means to control the movement of the gate toward the plane seat, the last mentioned means being actuable from outside of the casing.

4. A gate valve including a casing having inlet and outlet ends, a gate, said casing having a continuous plane seat for the gate, said seat facing the outlet end of the casing, said gate having a beveled edge at the lower end thereof for scraping excess solids from said plane seat, guide means for the gate to permit movement of the latter between open and closed position with a clearance with the plane seat to prevent abrasion of said beveled edge by said seat, including means acting on the gate at spaced points for automatically causing movement of said gate against the plane seat in the closed position of the gate to thus cause tight closing of the valve, the guide means being cut away at the lower portion of the casing to permit a flow from said inlet to wash away solids at the lower portion of said seat, and means for adjusting the automatic means to control the movement of the gate toward the plane seat, said adjusting means being actuable from the outside of the casing.

5. A gate valve including a casing, a gate therefor, the casing having a grooved seat for the gate, the grooved seat having a lower face portion thereof removed to prevent clogging, and the gate having marginal scoop portions projecting downward below the bottom of the gate for clearing solid materials from the grooved seat at the sides of the casing coincident with the downward movement of the gate, whereby a portion of said materials are washed away before the valve is closed.

6. A gate valve including a casing having a grooved seat, a gate movable in said seat between open and closed positions, said gate having portions at the side edges thereof projecting below the bottom of the gate, said portions being movable within a portion of the grooved seat to clean the latter in course of moving the gate from open to closed position.

7. A gate valve including a casing, a gate therefor, said casing having a grooved seat for the gate, the grooved seat having a face portion thereof removed at the bottom of the casing, the gate having a bevel at one side providing a bottom knife edge, the gate having at its bottom scoop portions for cleaning the grooved seat, said scoop portions being beveled to provide confronting faces that converge upwardly toward each other.

8. A gate valve including a casing having a passage having an inlet end and an outlet end, a gate, the casing having side walls having a grooved seat for the gate, the casing having a plane bottom seat for a side of the gate, the latter having means for expelling solid materials from the grooved seat toward the central region of said passage at the side of the plane seat nearest to the outlet end, whereby a flow into the casing readily washes away said materials from the region of the gate seat.

9. A gate valve including a casing having a slideway intersecting said passage, said gate being movable upward and downward in the slideway, across said passage to open and close the same, the upper wall of said passage along the slideway being provided with beveled edge portions to scrape the gate clean in course of upward opening movment thereof.

10. A gate valve including a casing, a gate, the casing having side walls having a grooved seat for the gate, said casing having a bottom recess in direct communication with said seat at the bottom of the casing, the gate having a section having a bottom straight edge, a strip of hardened metal connected to the gate along said edge, said strip having a beveled knife edge, and said strip having beveled scoop portions at the side edges of the gate, said knife edge and said scoop portions serving to clean the gate seat.

11. A gate valve including a casing, a gate therefor, the casing having a seat for the gate affording clearance with the faces thereof to permit free movement of the gate between open and closed positions, means external of the casing and connected to the gate at one end thereof for moving the gate between open and closed positions, and means coacting with said external means to move said gate toward one face of the seat to take up said clearance in the closed position of the gate, and the seat coacting with said gate at the other end thereof to cause said gate to move toward said seat, whereby a uniform tight closure is effected in the closed position of the gate.

12. A gate valve including a casing, a gate, the casing having a seat for the gate providing a clearance with opposite faces of the gate so that the gate is freely movable between open and closed positions, packing for the gate, a gland for the packing coordinated with the casing to exert a higher pressure on the packing at one face of the gate than at the other face thereof to thus tend to move the gate toward one face of its seat, and means remote from said gland for moving said gate toward said face of the seat in the closed position of the gate, whereby said gate can afford a uniform tight closure.

13. A gate valve including a casing having side walls providing a grooved seat, a gate movable along said seat, the casing having a plane one face seat for the gate at the bottom of the casing, the latter having a bottom opening, a plate movably connected to the casing to close said bottom opening, said plate carrying means that projects upward to engage the gate to press the same powerfully against said one face seat in the closing position of the gate, and externally accessible means for moving said plate along said opening to adjust the relation of said gate engaging means relative to said one face seat.

14. A gate valve including a one piece casing, a gate, the casing having a seat for the gate, said seat comprising opposed faces between which the gate is slidable, the seat being fixed with respect to the casing, and means for taking up wear between the gate and seat, including means responsive to a movement of the gate into closed position for moving said gate into snug engagement with one face of said seat, and means for adjusting the responsive means to control the movement of the gate toward said seat, the adjusting means including threaded actuator means accessible externally of the casing.

15. A gate valve including a casing having a passage having an inlet end and an outlet end, a gate, the casing having side walls grooved to provide confronting seat portions for the gate, said casing having a bottom wall having a seat portion lying in the plane of one of the confronting seat portions, toward the inlet end of the casing, the bottom seat portion being free and unobstructed to prevent clogging, and the gate having means for expelling solids from the grooves toward the central region of said passage, whereby a flow into the casing readily washes away the solids from the region of the gate seats.

FRED E. RILEY.